United States Patent [19]
Hicks

[11] 3,893,255
[45] July 8, 1975

[54] HOLDER FOR LIVE BAIT

[76] Inventor: Thomas Weems Hicks, 3121 Maple Dr. S.E., Atlanta, Ga. 30305

[22] Filed: July 16, 1973

[21] Appl. No.: 379,806

[52] U.S. Cl.................................. 43/41; 43/44.4
[51] Int. Cl............................................. A01k 97/04
[58] Field of Search ............ 43/41, 41.2, 44.2, 44.4

[56] References Cited
UNITED STATES PATENTS

| 2,632,276 | 3/1953 | Hale | 43/41 |
| 2,769,267 | 11/1956 | Ansley | 43/41 |

FOREIGN PATENTS OR APPLICATIONS

| 454,454 | 2/1949 | Canada | 43/41 |

Primary Examiner—Hugh R. Chamblee
Assistant Examiner—J. Q. Lever
Attorney, Agent, or Firm—Jones, Thomas & Askew

[57] ABSTRACT

A holder for live bait which includes a flexible transparent shell defining a cavity sized and shaped to receive the forward body portion of a bait fish such as a minnow. An opening is defined at the rear portion of the shell for the insertion of the bait fish and the protrusion of the tail of the bait fish, and internal, forwardly extending scale elements protrude inwardly from the shell adjacent its rear opening for interengagement with the scales of the bait fish to retain the bait fish in the shell. A hook is connected to the shell and is rotatable with respect to the shell so that its barb can be positioned in the cavity of the shell for storage and handling, or rotated to an outwardly protruding position when the holder is in use. The shell is fabricated from transparent material and can be colored for attracting game fish.

12 Claims, 12 Drawing Figures

HOLDER FOR LIVE BAIT

BACKGROUND OF THE INVENTION

When fishing for game fish, one of the best baits available is usually live bait. In many situations the natural motion of the live bait seems to attract game fish more frequently than the various artificial lures and other dead bait. Also, bait of colors which is highly visible in water seems to attract the game fish.

Devices have been developed in the past in an attempt to attach, confine, or somehow connect live bait to a fishing line, but the prior art devices usually have either caused the bait to die soon after its attachment to the device, or to impede the motion of the bait in the water so that the live bait does not retain its ability to swim and otherwise attract the game fish.

SUMMARY OF THE INVENTION

Briefly described, the present invention comprises a holder for live bait fish which enables the live bait fish to be connected to a fishing line, hook and other devices, whereby the movement of the bait fish is not so restrained that the bait fish cannot swim or otherwise move in the water, and the holder does not kill the bait fish. The holder comprises a flexible shell which defines a cavity sized and shaped to receive the front body portion of the live bait fish, and a tail opening is provided so that the bait fish can be inserted through the tail opening into the shell cavity with its tail protruding from the shell, thus leaving the tail of the bait fish free to enable the fish to swim and otherwise move about in the water while confined in the shell. Internal forwardly extending scale elements are struck from the shell at its rear side portions so as to inter-engage with the scales or the like of the bait fish and keep the bait fish from backing out of the tail opening of the shell. The scale elements of the shell extend forwardly with respect to the shell so that the scale elements do not impede the insertion of the bait fish through the tail opening into the shell or injure the bait fish while being inserted into the shell, and the scale elements usually do not injure the bait fish under normal use conditions but are effective to retain the bait fish within the shell.

The shell material is colored so as to be highly visible in water, yet the shell material is transparent so that the bait fish is visible to both the fisherman and the game fish.

Thus, it is an object of the present invention to provide a holder for live bait for connecting live bait to a fishing line without entirely impeding the ability of the bait to swim or otherwise move in the water.

Another object of this invention is to provide a live bait holder for bait fish or the like which allows the bait fish to be connected to a fishing line without killing the bait fish and without substantially impeding the ability of the bait fish to swim or otherwise move in the water and attract the game fish.

Another object of this invention is to provide a method of fabricating a live bait holder.

Other objects, features and advantages of the present invention will become apparent upon reading the following specification, when taken in conjunction with the accompanying drawing.

DESCRIPTION OF A PREFERRED EMBODIMENT

Figure 1:
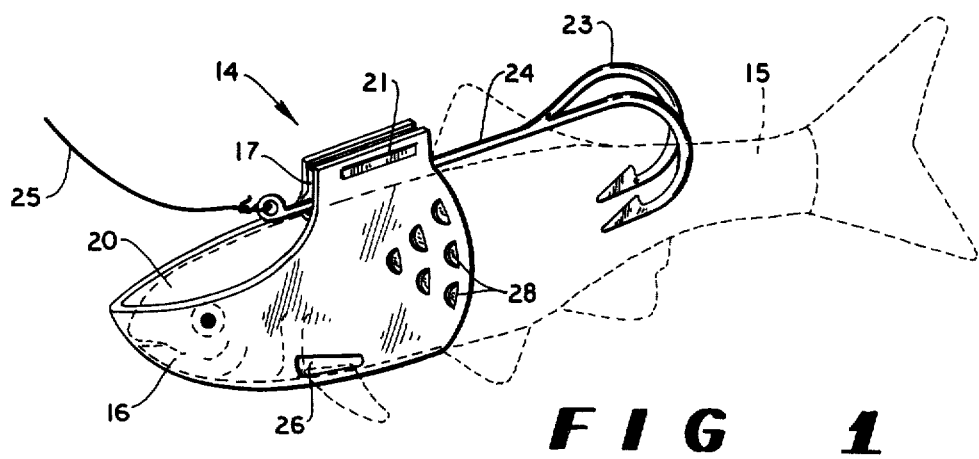
FIG. 1 is a perspective view of the holder for live bait, illustrating the manner in which a live minnow would be retained in the holder.
Figure 2:
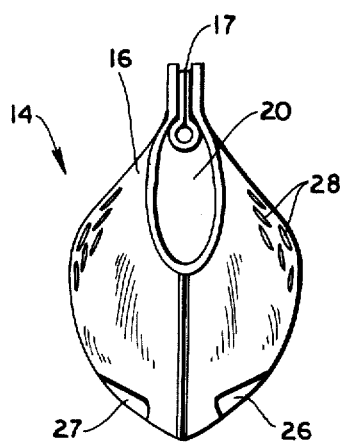
FIG. 2 is a front view of the holder.

Referring now in more detail to the drawing, in which like numerals indicate like parts throughout the several views, FIG. 1 illustrates the holder 14 for holding live bait such as a minnow 15. Holder 14 comprises flexible shell 16 and hook retaining means 17. Flexible shell 16 is fabricated from a transparent polypropylene and is of one piece construction. Flexible shell 16 defines an internal cavity 18 which is sized and shaped to receive the forward body portion of minnow 15, tail opening 19 and front opening 20. As will be disclosed in more detail hereinafter, flexible shell 16 is fabricated from a single sheet of material and is folded over upon itself and joined along its edges at 21. The connected or joined portions 21 can be disposed on top of or below the flexible shell 16.

A single sheet of flexible material folded over upon itself and joined together with the joined portion 21 of flexible shell 16 forms a tubular member and comprises hook retaining means 17. The joining of flexible shell 16 and hook retaining means 17 is from applying pressure and heat at the folded-over protions of these thermoplastic materials so that the materials fuse together and become integrally connected together.

Hook 23 is connected to holder 14 by inserting the shank 24 of the hook in the hook retaining means 17. A fishing line 25 can be connected to the eye of the hook. Hook 23 can be a single or multiple barb hook, and the shank 24 of the hook can be rotated to position the barb of the hook at various different attitudes with respect to the flexible shell 16. In the arrangement illustrated in FIG. 1, a double barb hook is disclosed with its barbs located on opposite sides of the tail of the minnow 15.

Flexible shell 16 defines a pair of fin openings 26 and 27 in its lower portion for receiving the forward fins of the minnow 15, and a plurality of inwardly protruding forwardly extending scale elements 28 are struck from the material of flexible shell 16 adjacent tail opening 19. Scale elements 28 are formed in rows, and are offset from row to row. Scale elements 28 are sized and shaped so as to engage the surface of the minnow 15, and the forward directional protrusion of the scale element allows the minnow 15 to be inserted into the cavity of the flexible shell through the tail opening 19. When the minnow is being inserted into the shell, scale elements 28 flex away from the minnow. When the minnow moves rearwardly with respect to flexible shell 16, scale elements 28 engage the scales of the minnow, and the relative engagement of the scales of the minnow and the scale elements 28 of the flexible shell restrain the minnow 15 from moving rearwardly with respect to the flexible shell. Of course, the minnow can be forceably pulled rearwardly from the flexible shell, but it is likely that the scale elements 28 of the shell will bend further inwardly and some of the scales of the minnow will be stripped from the minnow.

Figure 4:
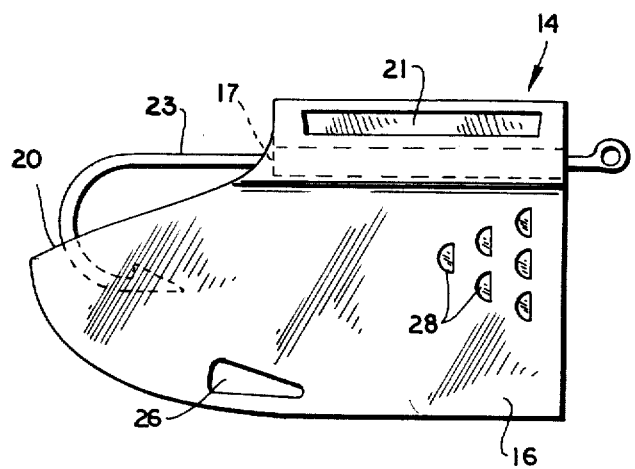
FIG. 4 is a side view of the holder.
Figure 3:
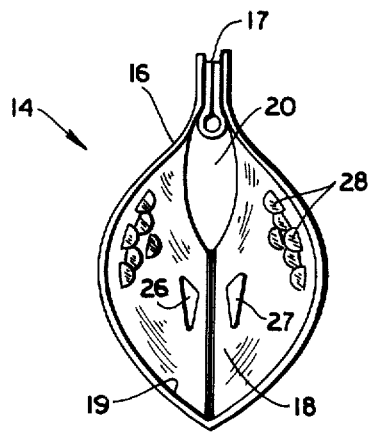
FIG. 3 is a back view of the holder.

Hook 23 of holder 14 can be oriented with its barb protruding forwardly or rearwardly of hook retaining means 17. Moreover, hook 23 can be rotated to the position illustrated in FIG. 4 where its barb extends downwardly through the forward opening 20 in the flexible shell, so that the holder 14 can be handled without substantial hazard of having the barb of the hook impale the handler. When the hook is rotated to the position desired with respect to the flexible shell 16, the eye of the hook can be pulled partially through hook retaining means 17 so that enlarged eye of the hook is forced into the tubular portion of the hook retaining means, therefore wedging the hook in a static position with respect to the flexible shell. The fisherman is thus able to accurately position the hook 23 with respect to the flexible shell 15 and the hook will retain this position under normal conditions. Moreover, when the fisherman desires to insert a minnow into the holder 14, the eye of the hook 23 can be pulled entirely through hook retaining means 17, with the fishing line attached to the eye of the hook extending back through the hook retaining means to completely remove the hazard of the hook from the vicinity of the holder. The fisherman is thus able to handle the holder 14 without substantial hazard of being impaled by the hook. When the fisherman is ready to set the hook with respect to the holder, he merely pulls the fishing line back through the hook retaining means 17 until the eye of the hook is again wedged in the hook retaining means 17.

Forward opening 20 of flexible shell 16 is relatively long and narrow, and when it is desired to remove the minnow 15 from the flexible shell 16, the forward portion of the flexible shell 16 can be compressed so as to enlarge the forward opening 20, by making the forward opening 20 wider and by pushing the minnow forwardly with respect to the flexible shell, whereupon the minnow will be guided by the flexible shell 16 out of the forward opening 20. When the flexible shell 16 is not deformed for the purpose of releasing the minnow, the forward opening 20 is too narrow and located in the wrong position to permit the escape of the minnow. This manner of releasing the minnow 15 from the flexible shell 16 allows the minnow to be removed from the flexible shell without injury, so the minnow can be placed back in the minnow bucket, etc., and used again at a later time.

As is illustrated in FIGS. 5–11, holder 14 is fabricated from sheet material 30 which is intermittently fed from a supply 31 to a molding station 32. The sheet material is vacuum formed at the molding station 32 into rows 34 of double-ended shell blisters. The rows of shell blisters 34 are separated from one another, and each row of shell blisters 34 is fed to a punching station 35 where each blister is placed over a male mold member 36 and a plurality of punch elements 38 penetrate the double-ended shell blisters to strike the internal scale element 28. The rows of double-ended shell blisters 34 are then fed to a cut out and fin punch station 40 where the fin openings 26 and 27 are struck from each of the double-ended shell blisters, and each of the double-ended shell blisters is cut from its row of double-ended shell blisters. The edges of the double-ended shell blisters 41 are then folded over upon themselves, and the end folded over portions are mated with the folded-over sheet which forms hook retaining means 17, and the thermoplastic materials joined together at 21 by pressure and heat. The double-ended shell blister is now a double-ended flexible shell, and is subsequently cut in half between the internal scale elements 28 and across hook retaining means 17. The separation of the double-ended flexible shell creates the tail opening 19 in each single flexible shell 16.

Figure 12:
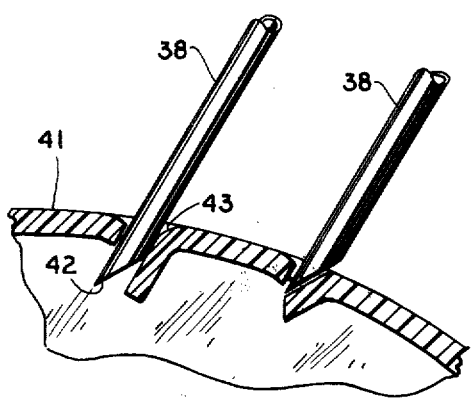
FIG. 12 is a detail illustration of the manner in which the internal scale elements of the holder are struck from the shell.
Figure 5:
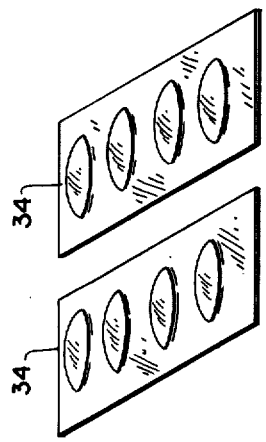
FIGS. 5–11 are progressive schematic illustrations of the manner in which the holder is fabricated.
Figure 6:
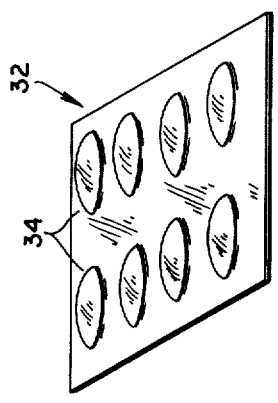
Figure 7:
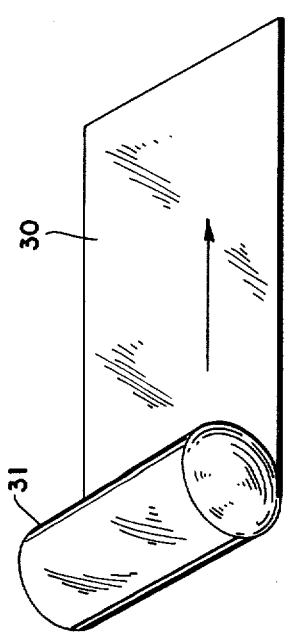
Figure 8:
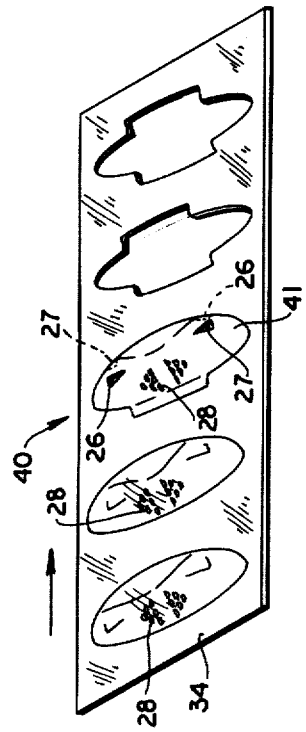
Figure 9:
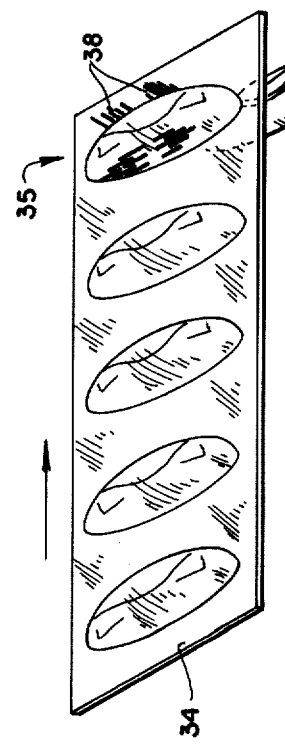
Figure 10:
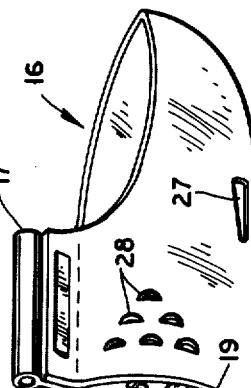
Figure 10:
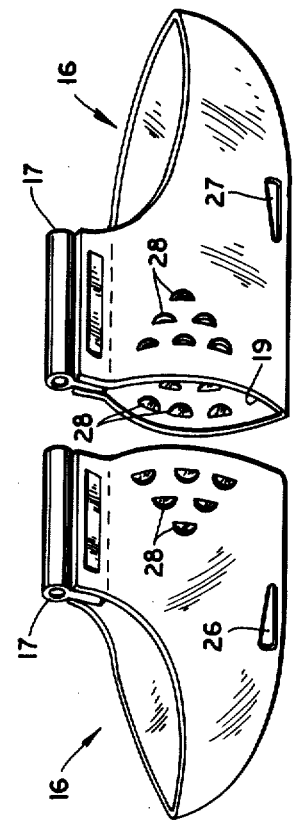

As is illustrated in more detail in FIG. 12, the internal scale elements 28 of the flexible shell are formed by a plurality of punches 38 which penetrate the double-ended blister 41. Each punch 38 includes a pointed tip 42 which first cuts through the double-ended blister, and a recessed blunt heel 43 that does not cut the blister material. Heel 43 tends to crease the cut flap or scale element so that it protrudes inwardly of the double-ended blister and the ultimate flexible shell which is fabricated from the blister. The punches 38 can be formed in various configurations to form different shaped scale elements. For instance, pointed scale elements or scale elements of other configurations can be struck from the double-ended blister by using different shaped punch elements.

Figure 11:
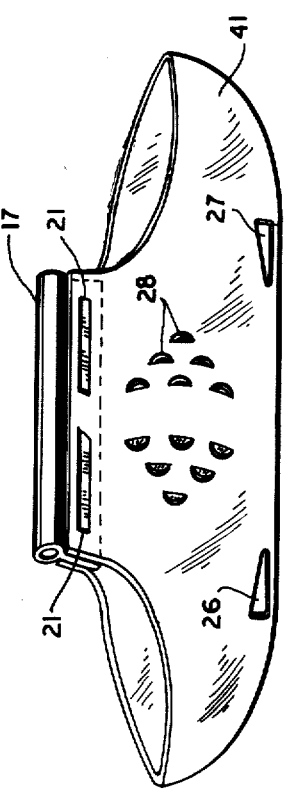

It will be noted by comparing the flexible shells of FIG. 11 with the flexible shells of FIGS. 1–4 that the hook retaining means 17 can have its tubular portion located outside the flexible or inside the flexible shell, with the hook retaining means 17 located on the same side of the joined portion 21 as the flexible shell 16 are on the opposite side of the joined portion 21 from the flexible shell.

While this invention has been described in detail with particular reference to preferred embodiments thereof, it will be understood that variations and modifications can be effected within the spirit and scope of the invention as described hereinbefore and as defined in the appended claims.

I claim:

1. A holder for live bait comprising a flexible shell of a length shorter than the length of the live bait comprising a one piece sheet folded over upon itself and joined along its upper edge to form a cavity for enclosing the forward portion of the body of the live bait, a tail opening defined at the rear portion of said holder so that the tail portion of the bait in said holder normally extends from within said cavity through said tail opening; a plurality of internally and forwardly extending scale elements struck from said flexible shell at said tail opening, said scale elements being sized and shaped to contact the live bait and inter-engage with the scales or the like of the live bait to retain the forward body portion of the live bait in the cavity of said shell, an elongated opening defined in the upper portion of said flexible shell forwardly of the joined portion, and hook retaining means connected to said flexible shell at the joined portion of said flexible shell.

2. A holder for live bait comprising a flexible shell of a length shorter than the length of the live bait comprising a one piece sheet folded over upon itself and joined along one of its edges to form a cavity for enclosing the forward portion of the body of the live bait, a tail opening defined at the rear portion of said holder so that the tail portion of the bait in said holder normally extends from within said cavity through said tail opening, and hook retaining means connected to said flexible shell at its joined portion, said hook retaining means comprising a sheet folded over upon itself and joined at its edges to the joined portion of said flexible shell and forming an elongated tube for receiving the shank of a hook or the like.

3. The holder of claim 2 and wherein the elongated tube of said hook retaining means and the cavity of said flexible shell are positioned on opposite sides of the joined portion of said flexible shell.

4. The holder of claim 2 and wherein the elongated tube of said hook retaining means and the cavity of said flexible shell are positioned on the same side of the joined portion of said flexible shell.

5. A holder for live bait comprising a flexible shell defining a cavity for receiving the forward portion of the body of the bait, a tail opening at the rear portion of said shell of a size and shape to receive the forward body portion of the bait therethrough and so that the tail portion of the bait in said holder normally extends therethrough, a plurality of internally and forwardly extending scale elements struck from said shell and arranged in multiple rows on each side of said flexible shell for engaging the bait and engaging the scales or the like of the bait, and a hook member including a shank portion and a barb portion, the shank portion of said hook being rotatably connected to said flexible shell so that the barb portion can be rotated to a protected location within the cavity of said flexible shell or rotated to an exposed location.

6. The holder for live bait as set forth in claim 5 and wherein said plurality of internally and forwardly extending scale elements are generally crescent-shaped.

7. The holder for live bait as set forth in claim 5 and wherein said flexible shell is transparent.

8. The holder for live bait as set forth in claim 5 and wherein said flexible shell is transparent and of a color which is highly visible in clear water.

9. A holder for live bait comprising a flexible shell of a length shorter than the length of the live bait comprising a single sheet of material folded over upon itself and joined along its opposite edges adjacent the rear portion of said shell to form a cavity for enclosing the forward portion of the body of the live bait, a tail opening defined at the rear portion of said holder so that the tail portion of the bait in said holder normally extends from within said cavity through said tail opening, an opening defined in the portion of said flexible shell forwardly from the joined portion, hook retaining means comprising a tubular member connected to said flexible shell at the joined portion, and a hook member including a shank portion and a curved barb portion, the shank portion of said hook being positioned in said tubular member, said hook member being rotatable in said tubular member so that the pointed end of its curved barb portion is positionable inside the cavity of said flexible shell.

10. A holder for live bait comprising a flexible shell of a length shorter than the length of the bait and defining an internal cavity and a tail opening of a size and shape suitable for receiving the forward body portion of the bait, said shell comprising a plurality of internally and forwardly extending scale elements positioned on opposite sides of said shell for inter-engaging with the scales of the bait in a reverse relationship when the bait is present in the shell for retaining the forward body portion of the bait in said cavity with the tail portion extending through said tail opening, whereby the shell is compressible to flex the scale elements away from the bait to permit the bait to be inserted into the cavity.

11. A holder for live bait comprising a flexible shell of a length shorter than the length of the live bait defining a cavity for enclosing the forward portion of the body of the live bait, a tail opening defined at the rear portion of said holder so that the tail portion of the bait in said holder normally extends from within said cavity through said tail opening, and a plurality of internally and forwardly extending scale elements struck from said flexible shell on opposite sides of said shell at said tail opening, said scale elements being sized and shaped to contact the live bait and inter-engage with the scales or the like of the live bait to retain the forward body portion of the live bait in the cavity of said shell.

12. The holder as set forth in claim 10 and wherein said shell is fabricated from thermoplastic material.

* * * * *